Oct. 20, 1970 W. B. VANDERSLICE, JR 3,535,558
CURRENT OR VOLTAGE SOURCE
Filed Dec. 26, 1967
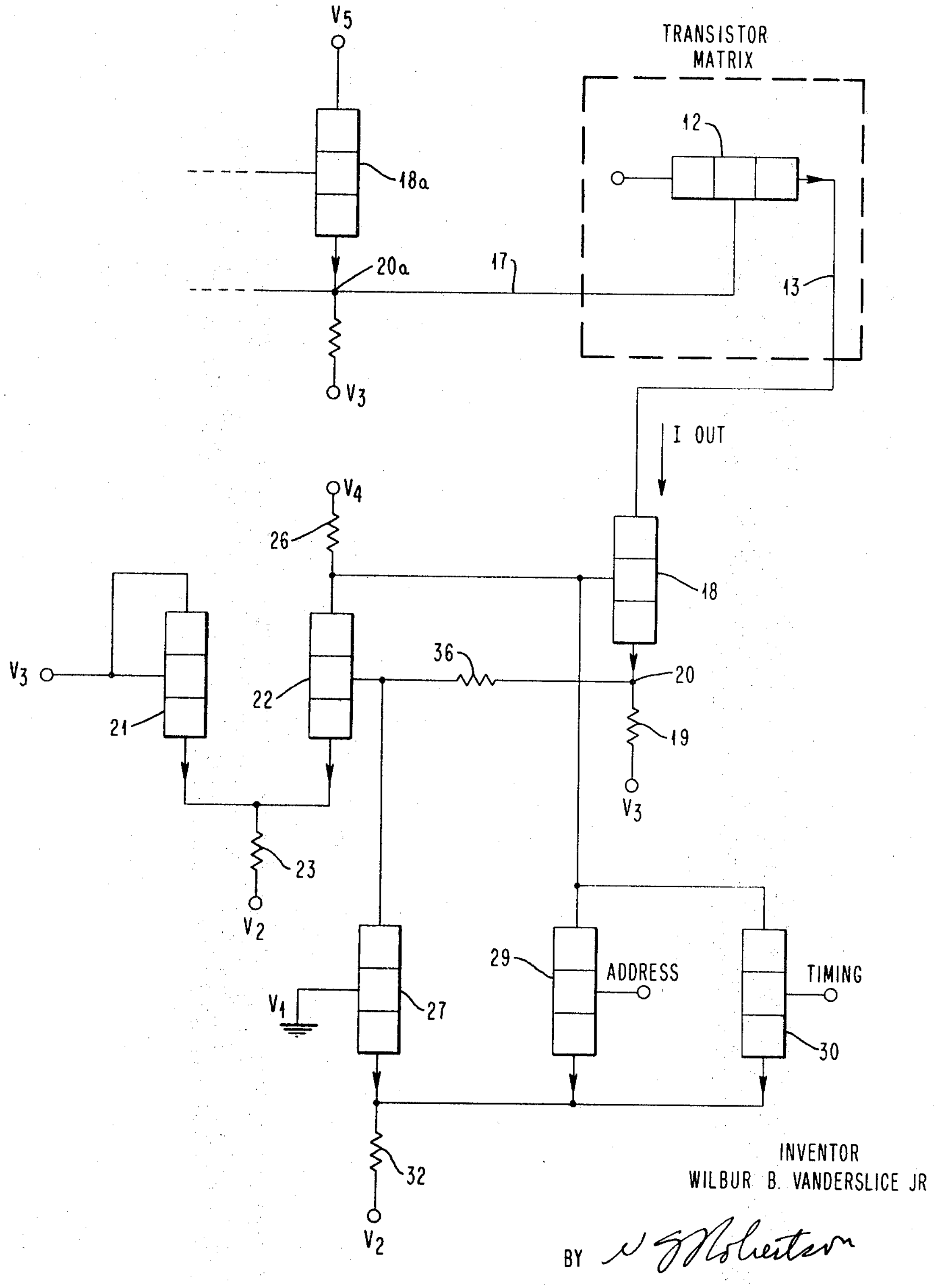
INVENTOR
WILBUR B. VANDERSLICE JR
BY
ATTORNEY United States Patent Office 3,535,558
Patented Oct. 20, 1970

3,535,558

CURRENT OR VOLTAGE SOURCE

Wilbur B. Vanderslice, Jr., Burlington, Vt., assignor to International Business Machines Corporation, Armonk, N.Y., a corporation of New York Filed Dec. 26, 1967, Ser. No. 693,388
Int. Cl. H03k 3/26
U.S. Cl. 307—270 7 Claims

ABSTRACT OF THE DISCLOSURE

This invention provides a transistor circuit that can be connected to produce pulses of either a predetermined voltage level or a predetermined current level. The circuit is particularly intended for driving either the base terminals or the emitter terminals of transistors that are connected in a matrix for decoding addresses in a memory of a data processing system. This invention provides a feed-back circuit that operates in both the output condition and the no output condition of the transistor circuit such that both output levels are regulated and the voltage or current output level is more accurately maintained.

INTRODUCTION

An example of an application of the circuit of this invention to a memory for data processing system will be a helpful introduction to the objects and features of the invention. In such a memory, storage elements such as magnetic thin film elements are arranged in groups called words that can be uniquely accessed for a read or a write operation when a current is applied to an associated wire that is coupled to each element of the word. The words are identified by address signals that correspond to the numerical sequence of the addresses. Thus an address made up of only a few bits can represent any one of a very large number of addresses in the memory. Circuits called address decoders receive the address signals and produce a current on the particular word wire that corresponds to the address. In a simple decoder which is particularly useful in high speed memories, there is a transistor for each word of the memory and each of these transistors has its collector terminal connected to the wire for the associated word. These transistors are arranged in rows and columns of a matrix with a wire for each row connected to the base terminals of the transistors of the associated row and with a wire for each column connected to the emitter terminals of each transistor of the column. For each row there is a circuit that responds to the signals in one half of the address to turn on when the addressed transistor is in the associated row. The circuit is connected to apply a forward biasing voltage to the base terminals of the transistors of the associated row. When the transistor being addressed is in a different row and at particular times within the memory operating cycle, the row circuit provides a reverse biasing voltage at the base terminal of its transistors. For each column wire there is a circuit that responds to the signals in the other half of the address to turn on when the addressed transistor is in the associated row. The column circuit applies a predetermined current level to the column wire and the addressed transistor supplies the current to the addressed word wire of the memory.

THE PRIOR ART

One goal in this art is to provide a circuit that can be connected either to provide the decoding and predetermined current level of an emitter driving circuit or to provide the decoding and preset voltage output for a base driving circuit. A circuit of this general type has been disclosed by R. S. Schumacher and the IBM Technical Disclosure Bulletin of November 1966 at page 709. The output stage of this circuit is a transistor connected with a resistor in its emitter circuit. When a voltage is applied at the base terminal of the output transistor to turn on the transistor, a corresponding voltage appears at the emitter terminal and a current that is proportional to this voltage and to the value of the resistor appears at the collector terminal. In this circuit, feed back is provided from the emitter terminal of the output transistor to the base terminal of the output transistor to maintain the voltage and the current at regulated preset values. An object of this invention is to provide an improved circuit of this general type.

THE INVENTION

In the circuit of this invention means is provided to maintain the output tansistor slightly conductive when it is in the no output state. In this condition, the feed back circuits remain operable whether the circuit is in the output state or the no output state.

An important advantage of this circuit is that the voltage applied to the output transistor to maintain it in its no output state can be at a minimum level. As component values of the circuit change, the feed back circuit remains operable and maintains the circuit in its no output condition. By contrast, in circuits of the known prior art, variations in the output level during the no output condition have been prevented by applying to the transistor a sufficiently high turn off voltage to prevent the output transistor from turning on under any circumstance. With this improvement, the circuit of this invention can be turned on much faster than circuits of the prior art.

The foregoing and other objects, features and advantages of the invention will be apparent from the following more particular description of a preferred embodiment of the invention, as illustrated in the accompanying drawing.

THE DRAWING

The drawing shows the preferred embodiment of the circuit of this invention.

THE CIRCUIT OF THE DRAWING

Introduction

In the drawing a transistor 12 illustrates a large number of transistors that are arranged in rows and columns of the transistor matrix. Each of these transistors has its collector terminal connected to a wire of a memory or an analogous load. A column wire 13 is connected to the emitter terminal of transistor 12 and to the emitter terminal of each transistor in the same column of the matrix as transistor 12. Each other column of the matrix has a similar individual column wire.

A row wire 17 is connected to the base terminal of transistor 12 and to the base terminal of each transistor of the same row as transistor 12. Each other row of the matrix has a similar individual row wire.

The drawing shows the circuit of this invention connected as a emitter driver with an output transistor 18 connected with an emitter resistor 19 and a point of potential V3 to produce a current on the column wire 13. The drawing also shows a fragment of an identical circuit connected as a base driver with the emitter terminal of output transistor 18*a* connected to row wire 17. An individual circuit connected as a base driver is provided for each row of the matrix and an individual circuit connected as an emitter driver is provided for each column of the matrix. In the operation of accessing the memory one base driver and one emitter driver are turned on to produce a selected current level at the collector terminal of the addressed transistor.

The circuit

The circuit of the drawing includes the transistor 18 and resistor 19 already introduced, two transistors 21 and 22 that are connected with resistors 23 and 26 as a linear differential amplifier and a group of transistors 27, 29 and 30 that are connected with a resistor 32 as a well known digital logic circuit that is called a current switch.

In the current switch, a potential point V2 and the resistor 32 form a source of current that is switched between transistor 27 and transistors 29 and 30 according to which of the transistors has the more positive potential at its base terminal. Transistor 27 has its base terminal connected to ground (V1), and transistor 27 conducts in its collector circuit when transistors 29 and 30 both have input signals at their base terminals that are negative with respect to ground. When either transistor 29 or 30 has its input more positive than ground, that particular transistor turns on and transistor 27 turns off.

Transistors 29, 30, and additional similarly connected transistors receive timing and address signals. The collector terminals of these transistors are connected together to produce the OR Invert logic function of the input signals at the common connection of their collector terminals. When the memory is not going through a read or write operation and at certain times during the memory operating cycle, transistor 30 receives a timing signal to turn on and to thereby turn off transistor 27. When matrix transistor 12 is to be turned on, transistors 29 and 30 both receive input levels to be turned off but each of the other emitter driver circuits associated with the transistor matrix responds to the address signal to maintain a counterpart of transistor 29 conducting. Thus, transistor 27 is turned on and its counterparts in the other emitter driver circuits are kept off.

In the differential amplifier, the base terminal of transistor 21 is connected to a fixed potential point V3. The base terminal of transistor 22 is connected by a resistor 36 to the regulated voltage point 20, and the collector terminal of transistor 22 is connected to the base terminal of output transistor 18. These connections provide negative feedback from terminal 20 to the base terminal of transistor 18 for regulating the voltage at terminal 20. The collector terminal of transistor 27 of the current switch is connected to the base terminal of transistor 22, and the common connection point of the collector terminals of transistors 29 and 30 of the current switch is connected to the base terminal of transistor 18. These connections establish the voltage regulation at point 20 at one of two levels according to the conduction state of the current switch, as will be explained next.

Operation in the no output state

As has already been explained, in the no output state transistor 27 is off and one of the other transistors of the current switch is on. The on transistor conducts a component of the current through resistor 26 of the differential amplifier and thereby tends to maintain output transistor 18 in a low conduction state (but not turned off) independently of the regulating action provided by the differential amplifier.

The differential amplifier cooperates with resistor 36 to produce at terminal 20 an output voltage , E*o*, that is defined by the following equation:

$$Eo=V3+[Vbe(22)-Vbe(21)]+Ib(22)R(36)$$

This equation defines the voltage drops between the fixed potential point V3 at the base terminal of transistor 21 and the regulated voltage point 20. The term V*be* designates the voltage between the base and emitter terminals of the transistor identified by the number in parentheses, These terms have opposite polarity because the circuit path of the equation is from base to emitter through one transistor and from emitter to base through the other transistor. The value of the term V*be* depends in part on the characteristics of the individual transistors 21 and 22, and these transistors are preferably made as an integrated circuit to have closely similar characteristics. Thus, variations in this characteristic of transistors 21 and 22 during the operation of the circuit tend to be equal and offsetting and to have no effect on the output voltage of the circuit.

As the equation shows, variations in the output voltage produce corresponding changes in the base current, I*b*(22), of transistor 22. In response to these changes in base current, transistor 22 varies the voltage at its collector terminal to produce voltage regulating changes in the conduction state of transistor 18. The collector current of transistor 18 is closely regulated to a value established by the resistance of resistor 19 and the voltages V3 and E*o* at the two terminals of the resistor.

In the circuit of the drawing, the reference voltage V3 applied to the base terminal of transistor 21 of the differential amplifier is the same as the voltage applied to the fixed potential end of resistor 19. The voltage drop across resistor 36 has a polarity and amplitude to assure that the output voltage E*o* is positive with respect to the voltage V3 at the fixed potential terminal of resistor 19 and that a corresponding low value current flows in the emitter-collector circuit of transistor 18. A suitable clamp circuit may be connected at the collector terminal of transistor 18 to isolate the transistor 12 from this current.

Operation in the output state

In the output state, transistors 29 and 30 are off (and can be disregarded in the analysis of the circuit) and transistor 27 is on. Transistor 27 conducts a current level that is accurately defined by the characteristics of the transistor, the fixed voltage levels V1 and V2 associated with its base and emitter terminals, and the value of resistor 32. This current forms a component of the current in resistor 36 and thereby produces an additional offset between the voltage at the output terminal 20 of the circuit and the voltage applied to the base terminal of transistor 22. The output voltage across resistor 19 is defined more fully by the following equation:

$$Eo=\frac{[Vbe(22)-Vbe(21)]+\frac{\alpha(27)R(36)}{R(32)}[V1-Vbe(27)-V2]+\frac{Vbe(18)R(36)}{H_{FE}(22)R(26)}+\frac{Ib(18)}{H_{FE}(22)}-\frac{V4R(36)}{R(26)H_{FE}(22)}}{1-\frac{R(36)}{H_{FE}(22)R(26)}}$$

The additional terms include the difference in base to emitter voltages of transistors 21 and 22, which was introduced in the explanation of the operation of the circuit in the no output state, and terms that represent the drop across the resistor 36 produced by the base current of transistor 22 and the collector current of transistor 27.

An important feature of this circuit is that the values of resistors appear predominately as a ratio. Changes in value of these resistors during the operation of the circuit tend to be similar and to thereby have little effect on the output voltage.

Another advantage of the circuit is that it can be easily tested by varying the voltages V1 and V2 and observing the effects on the circuit output.

While the invention has been particularly shown and described with reference to the preferred embodiment thereof, it will be understood by those skilled in the art that various changes in form and details may be made therein without departing from the spirit and scope of the invention.

What is claimed is:

1. A circuit comprising, a first transistor, means connecting the collector terminal of said transistor to a point of first potential, and a resistor connected between the emitter terminal of said transistor and a point of second potential, a linear differential amplifier active in both high and low conduction states having first and second input terminals and having an output terminal, said first input terminal being connected to a point of given potential, means connecting said second input terminal to said first transistor emitter terminal whereby the output of said differential amplifier varies according to variations in the voltage at said first transistor emitter terminal, means connecting the output of said differential amplifier to said first transistor base terminal to oppose changes in conduction at said first transistor emitter terminal, and means for selectively introducing a predetermined voltage drop between said second input terminal and said first transistor emitter terminal for operating said first transistor in predetermined high or low conduction states.

2. A circuit according to claim 1 in which said means connecting said second input terminal to said first transistor emitter terminal comprises a second resistor whereby the difference in potential between said second input terminal and said first transistor emitter terminal equals substantially the voltage drop across said second resistor.

3. A circuit according to claim 2 in which said linear differential amplifier comprises, a second transistor having its base terminal connected to form said first input terminal, a third transistor having its base terminal connected to form said second input terminal, and a third resistor connecting the emitter terminals of said second and third transistors to a point of potential, and a fourth resistor connected in the collector circuit of said third transistor to form said output terminal at the collector terminal of said third transistor.

4. A circuit according to claim 2 in which said means for selectively introducing a predetermined additional voltage between said second input terminal and said first transistor emitter terminal comprises a digital logic circuit having a first output terminal connected to said second input terminal and operable in one state to produce a predetermined current in the circuit of said second resistor in a polarity to operate said first transistor in a predetermined higher current state.

5. A circuit according to claim 4 in which said digital logic circuit includes a second output terminal, means operable to produce a well defined current at said first output terminal in one logic state and to produce a current at said second output terminal in its other logic state, means connecting said second output terminal to the base terminal of said first transistor and means connecting said first output terminal to said differential amplifier second input terminal.

6. A circuit according to claim 5 in which said digital logic circuit comprises a current switch.

7. A circuit comprising, a first transistor, means connecting the collector terminal of said transistor to a point of first potential, and a resistor connected between the emitter terminal of said transistor and a point of second potential, whereby the voltage at said emitter terminal and the current at said collector terminal are functions of a voltage applied to the base terminal of said transistor, a second and a third transistor connected with a second resistor in the collector circuit of said third transistor and a fourth resistor connected between the common connection point of the emitter terminals of said transistors and a point of third potential to form a differential amplifier, means connecting the base terminal of said second transistor to said point of second potential, a resistor connecting the base terminal of said third transistor to the emitter terminal of said first transistor, and means connecting the collector of said third transistor to the base terminal of said first transistor, whereby said differential amplifier provides negative feedback between the emitter terminal and the base terminal of said first transistor for regulating the voltage at said first transistor emitter terminal, a digital current switch of the type operable to produce a current at one or the other of two output terminals according to a logic function of input signals applied to the current switch, means connecting one output of said current switch to the base terminal of said first transistor to operate said first transistor in a low conduction state when the output of said current switch is at said one output, and means connecting the other output of said current switch to the base terminal of said third transistor to produce across said second transistor a predetermined voltage drop for operating said first transistor in a high current state when the output of said current switch is at said other output.

References Cited

UNITED STATES PATENTS

| | | | |
|---|---|---|---|
| 3,194,985 | 7/1965 | Smith et al. | 307—254 XR |
| 3,281,608 | 10/1966 | Doyle | 307—253 XR |

OTHER REFERENCES

IBM Technical Disclosure Bulletin, vol. 10, No. 2, July 1967, written by D. P. Repchick, titled Bit Driver, pp. 186–187.

STANLEY T. KRAWCZEWICZ, Primary Examiner

U.S. Cl. X.R.

307—203, 296